United States Patent [19]

Niemi et al.

[11] 4,129,989
[45] Dec. 19, 1978

[54] BALLASTED FLOATING BARRIER BOOM

[75] Inventors: Ilmer I. Niemi; Kenneth S. Peterson, both of Cloquet, Minn.

[73] Assignee: Conwed Corporation, St. Paul, Minn.

[21] Appl. No.: 788,761

[22] Filed: Apr. 19, 1977

[51] Int. Cl.$^2$ ............................................. E02B 15/04
[52] U.S. Cl. .................................................. 405/70
[58] Field of Search ............... 61/1 F, 5; 210/242, 210/121, DIG. 21

[56] References Cited

U.S. PATENT DOCUMENTS

| Re. 27,640 | 5/1973 | Logan | 61/1 F |
|---|---|---|---|
| Re. 28,966 | 9/1976 | Blockwick | 61/1 F |
| 3,922,861 | 12/1975 | Grihangne | 61/1 F |
| 3,998,060 | 12/1976 | Preus | 61/1 F |
| 4,008,155 | 2/1977 | Castell | 210/242 R |
| 4,015,431 | 4/1977 | Ahiko | 61/1 F |

FOREIGN PATENT DOCUMENTS

| 1529754 | 5/1968 | France | 61/1 F |
|---|---|---|---|
| 1028470 | 5/1966 | United Kingdom | 61/1 F |

*Primary Examiner*—Jacob Shapiro
*Attorney, Agent, or Firm*—Eyre, Mann, Lucas & Just

[57] ABSTRACT

A floating ballasted oil containment boom provides a stable continuous barrier to the passage of petroleum or other contaminants floating on the surface of water. Boom elements are connected end to end by an overlapping joint.

15 Claims, 5 Drawing Figures

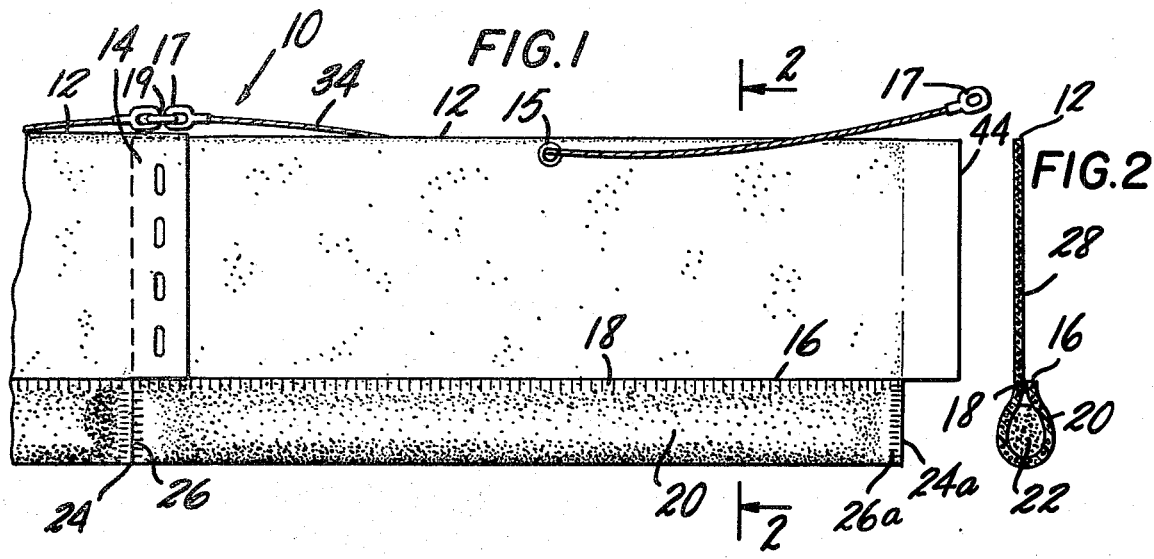
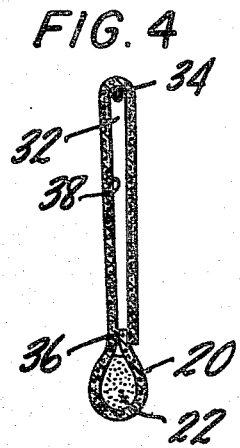
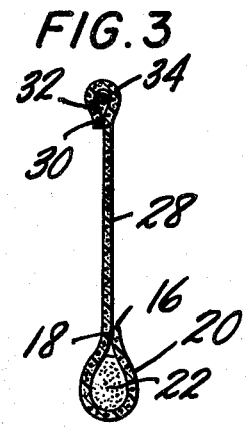
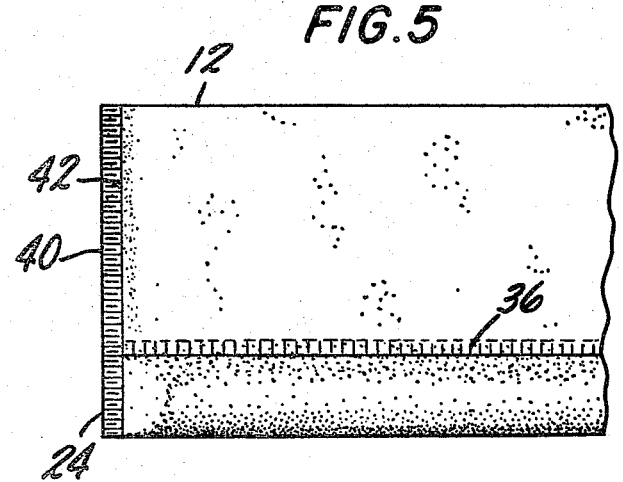

BALLASTED FLOATING BARRIER BOOM

BACKGROUND OF THE INVENTION

The spillage of floating contaminants, particularly petroleum products, on environmental waterways is an unfortunate but realistic concomitant to the operation of an industrial society. Responsible industrial concerns and governmental instrumentalities have used floating booms of various kinds to contain the floating contaminants while removal efforts were pursued.

Proper containment in naturally disturbed water requires that the boom extend downward a substantial distance into the water to prevent the contaminants from washing under the boom; and that it extend out of the water a substantial distance to prevent the contaminants from washing or splashing over the boom. In addition, it is desirable that the boom be rotationally stable about its longitudinal axis in order to avoid transporting contaminants from one side of the boom to the other on its surface.

Booms made of closed-cell plastic foam float too high on the water to avoid contaminant washing under. Other booms such as those made of steel and neoprene are so expensive that their use is restricted.

SUMMARY OF THE INVENTION

The present invention teaches a floating boom formed from a sheet of flexible plastic foam which has been formed to make a longitudinal pocket. The longitudinal pocket is filled with a ballast material having a specific gravity greater than that of the liquid on which it is to float. The foam material may have a thickness of from about ⅛ to 1 inch but is preferably from about ¼ to ⅜ inch thick and it may have a density from about 2 to about 10 pounds per cubic foot but is preferably from about 3 to about 6 pounds per cubic foot. The ballast material is preferably granular to enable rolling up the product for shipment and storage. Sand is the preferred granular ballast material for use on water since sand is normally acceptable in most water areas should the pocket become opened and the sand leak out.

An overlapping joint between boom elements is secured by sewing, stapling, cementing or welding to produce a continuous barrier to the contaminant.

In accordance with the present invention, the boom for containment purposes is made of a closed-cell flexible plastic foam. The advantage to a closed-cell foam is that it tends not to absorb water or oil and hence it will not become heavier and thus lower in the water. For petroleum containment on water, the boom preferably contains a flexible closed-cell polyethylene foam suitably of the type sold under the trade mark C-FOAM by the Conwed Corporation. For containment of certain industrial pollutants other than petroleum which may attack a polyethylene boom, or for use on liquid bodies other than water, other buoyant materials may be used without departing from the spirit and scope of this invention.

The applicant has discovered that a containment boom in a normal outdoor environment where a body of water is subject to wind generated waves requires at least about 6 inches below the surface and at least about 4 inches above the surface with better results being achieved with at least about 10 inches below and 6 inches above the surface. Shallower penetrations and extensions for sheltered regions and larger penetrations and extensions for rough or stormy conditions can be easily adopted from the present teaching by one skilled in the art.

BRIEF DESCRIPTION OF THE DRAWINGS

FIG. 1 shows a side view of an embodiment of the invention containing a single longitudinal ballast pocket.

FIG. 2 shows a cross section along 2—2 in FIG. 1.

FIG. 3 shows an alternative cross-section of an embodiment containing a ballast pocket at one edge of a sheet of flexible plastic foam and a reinforcing seam at the other edge.

FIG. 4 shows a cross-section view of an embodiment of the invention having a figure-eight cross section.

FIG. 5 shows a fragmentary side view of the embodiment shown in FIG. 4.

DETAILED DESCRIPTION OF THE PREFERRED EMBODIMENT

Referring to FIGS. 1 and 2, the boom 10 is made up of individual boom elements 12 attached by an overlapping joint 14 at their ends to form an assembly of indefinite length. The joint region in FIG. 1 is indicated by cross hatching. The joint is secured by any satisfactory means such as staples, screws, cementing, welding or sewing. A rope 34 may be used to take up longitudinal stress between adjacent boom elements 12. The rope 34 may be threaded through an eyelet 15 passing through the boom element 12 or may be retained in some other way as will be explained. The rope 34 of adjacent boom elements may be connected together by any convenient means such as tying but best results are achieved by providing loops 17 at each end and connecting adjacent loops together using snap rings 19 or other rapidly installed connecting means.

As better seen in FIG. 2, the boom element 12 is made of a sheet of flexible plastic foam in which the lower longitudinal edge 16 is folded back on itself and secured to the sheet to form a seam 18. The seam may be made by sewing, stapling, cementing, welding or other suitable means including integral extrusion if desired. A longitudinal pocket 20 is formed in the folded-up end. A ballast material 22, preferably sand, but possibly other material such as gravel, aluminum or lead chips or shot or the like, is deposited in the longitudinal pocket 20 to provide ballast for the boom element 12. The ends 24, 24A of the longitudinal pocket 20 are closed by seams 26, 26A to prevent loss of the ballast material 22.

When immersed in a liquid, the buoyancy of the foam material causes part of the vertical part 28 to remain above the mean water level. The ballasted longitudinal pocket 20 maintains the vertical part 28 in the correct upright orientation. If desired a reinforcing scrim or other suitable means may be used for maintaining vertical part 28 in position.

The embodiment shown in FIG. 3 is similar to the one shown in FIGS. 1 and 2 except that a top seam 30 produces a longitudinal reinforcing pocket 32 at the upper edge of the boom element 12. The longitudinal reinforcing pocket 32 is primarily to aid in maintaining the vertical section in its correct upright position. However, it also improves the resistance of the boom element 12 to tearing as well as optionally providing a means for securing a rope 34 threaded through it. The rope 34 may be used as previously described for securing the ends of the boom elements 12 together to form a continuous boom 10. The rope 34 may alternatively be installed in an eyelet 15 passing through both sides of the reinforcing pocket 32 similar to the attachment shown in FIG. 1. This latter method is the preferred embodiment.

It has been found that in certain applications, especially those where the boom will be left in the water for an extended period of time, auxiliary flotation means can be of advantage. These are suitably additional pieces of foam or hollow members (not shown), either of which may be enclosed within the pocket 32. Alternatively, known buoyant members such as cork, closed cell plastic may be affixed to the outside of the boom preferably towards the middle thereof.

The embodiment shown in FIG. 4 is the preferred embodiment and teaches a boom element in which the foam sheet is folded at top and bottom with the top and bottom ends overlapping and held together and to the side of the sheet by a single longitudinal seam 36 to form longitudinally contiguous longitudinal pockets. The cross section, as shown in FIG. 4 is generally an elongated figure-eight having a bottom longitudinal pocket 20 and a top longitudinal pocket 38. The bottom longitudinal pocket 20 contains ballast material 22 as described for other embodiments. The figure-eight cross section gives greatly improved rigidity while still requiring only a single longitudinal seam 36. The ends 24, 24A of the bottom longitudinal pocket 20 are closed by seams 26, 26A to prevent loss of ballast material 22. One end of the top longitudinal pocket 38 may optionally and preferably be closed by a vertical seam 42. The other end 44 of the top longitudinal pocket 38 is preferably left unsealed. In the drawing, end 40 is shown sewn and end 44 unsealed but it will be understood that end 44 could be sewn and enter unsealed end 40 and, in fact, this is the preferred form of construction. The end 24A of the bottom longitudinal pocket 20 terminates short of the end 44 of the top longitudinal pocket 38. Thus the seam area 14 at the end 44 forms an opening into which the end 42 of the adjacent boom element 12 may be inserted. The two boom elements 12 are attached as previously described. It is highly desirable that the length of the ballast pocket be shorter than the length of the overall boom since this will greatly facilitate joining together of adjacent booms with proper overlap to reduce leaks but yet without interference from the ballast pocket.

It will be understood that the claims are intended to cover all changes and modifications of the preferred embodiments of the invention, herein chosen for the purpose of illustration which do not constitute departures from the spirit and scope of the invention.

What is claimed is:

1. A boom for containing pollutants floating on water comprising:
   (a) at least two boom elements;
   (b) each of said at least two boom elements comprising:
      (i) a sheet of flexible buoyant polyethylene foam material;
      (ii) said polyethylene foam having a thickness of from about ⅛ to about 1 inch;
      (iii) said polyethylene foam having a density of from about 2 to about 10 pounds per cubic foot;
      (iv) a lower longitudinal pocket formed in said sheet;
      (v) an upper longitudinal pocket formed in said sheet;
      (vi) said upper and lower longitudinal pockets being continuous whereby they form a figure-eight cross section;
      (vii) granular ballast material at least partly filling said lower longitudinal pocket;
      (viii) a first end of said upper longitudinal pocket extending beyond said lower longitudinal pocket;
      (ix) said first end of said upper longitudinal pocket being unsealed;
   (c) the second end of a first boom element being fitted into said unsealed first end of a second boom element;
   (d) means attaching said first and second ends in their fitted relationship.

2. A boom as recited in claim 1 wherein said polyethylene foam is from about ¼ to about ⅝ inch thick and from about 3 to about 6 pounds per cubic foot.

3. An element for a boom for floating partially submerged in water comprising:
   (a) a flexible buoyant sheet of closed-cell plastic foam material;
   (b) said buoyant sheet having a longitudinal pocket formed by a fold in said sheet along one longitudinal edge thereof;
   (c) ballast material in said longitudinal pocket;
   (d) the ends of said longitudinal pocket being closed;
   (e) attachment means at the ends of said sheet for attachment to the ends of adjacent boom elements;
   (f) said plastic foam material having a specific gravity substantially less than water;
   (g) said ballast material having a specific gravity substantially greater than water;
   (h) said buoyant sheet and ballast material as a combination having a specific gravity less than water, whereby said boom floats in water partially submerged and partially projecting above the surface of the water;
   (i) a second longitudinal pocket along the second longitudinal edge of said buoyant sheet;
   (j) said ballast material is sand;
   (k) when floating is still fresh water the bottom of said sheet extends at least about 6 inches below the surface of still fresh water and top of said sheet extends at least about 4 inches above the surface of still fresh water;
   (l) said buoyant sheet being from about ⅛ to about 1 inch thick; and
   (m) said buoyant sheet weighing from about 2 to about 10 pounds per cubic foot.

4. The element for a boom recited in claim 3 wherein said buoyant sheet is from about ¼ to about ⅝ inch thick.

5. The element for a boom recited in claim 3 wherein said buoyant sheet is from about 3 to about 6 pounds per cubic foot.

6. The element for a boom recited in claim 3 further comprising a rope in said second longitudinal pocket.

7. The element for a boom recited in claim 3 wherein said second longitudinal pocket is longitudinally contiguous with said longitudinal pocket, whereby a figure-eight cross section is formed.

8. The element for a boom recited in claim 3 wherein:
   (a) said second longitudinal pocket is unsealed at at least one end thereof; and
   (b) said at least one unsealed end portion forming at least part of said attachment means.

9. The element for a boom recited in claim 3 wherein:

(a) the top edge of said sheet and the bottom edge of said sheet overlap each other; and
(b) a single longitudinal seam at said overlap forms said upper and lower longitudinal pockets.

10. The element for a boom recited in claim 3 further comprising additional pieces of buoyant material in said second longitudinal pocket whereby the long-term buoyancy of the element is improved.

11. The element for a boom recited in claim 3 wherein:
(a) the bottom of said sheet extends at least about 10 inches below the surface of still fresh water; and
(b) the top of said sheet extends at least about 6 inches above the surface of fresh still water.

12. An element for a boom for floating partially submerged in water comprising:
(a) a flexible buoyant sheet of closed-cell plastic foam material;
(b) said buoyant sheet having a longitudinal pocket formed by a fold in said sheet along one longitudinal edge thereof;
(c) ballast material in said longitudinal pocket;
(d) the ends of said longitudinal pocket being closed;
(e) the ends of said sheet being adapted to attachment to the ends of adjacent boom elements;
(f) said plastic foam material having a specific gravity substantially less than water;
(g) said ballast material having a specific gravity substantially greater than water;
(h) said buoyant sheet and ballast material as a combination having a specific gravity less than water, whereby said boom floats in water partially submerged and partially projecting above the surface of the water;
(i) a second longitudinal pocket along the second longitudinal edge of said buoyant sheet;
(j) said second longitudinal pocket being longitudinally contiguous with said longitudinal pocket, whereby a figure-eight cross section is formed;
(k) said second longitudinal pocket being unsealed at at least one end thereof;
(l) said at least one unsealed end portion forming said adaptation to attachment; and
(m) said second longitudinal pocket extending longitudinally beyond said one longitudinal pocket at said at least one end thereof.

13. The element for a boom recited in claim 12 wherein said second longitudinal pocket is sealed at a second end thereof.

14. An element for a boom for floating partially submerged in water comprising:
(a) a flexible buoyant sheet of closed-cell plastic foam material;
(b) said buoyant sheet having a longitudinal pocket formed by a fold in said sheet along one longitudinal edge thereof;
(c) ballast material in said longitudinal pocket;
(d) the ends of said longitudinal pocket being closed;
(e) attachment means at the ends of said sheet for attachment to the ends of adjacent boom elements;
(f) said plastic foam material having a specific gravity substantially less than water;
(g) said ballast material having a specific gravity substantially greater than water;
(h) said buoyant sheet and ballast material as a combination having a specific gravity less than water, whereby said boom floats in water partially submerged and partially projecting above the surface of the water;
(i) a second longitudinal pocket along the second longitudinal edge of said buoyant sheet;
(j) said ballast material being sand;
(k) when floating in still fresh water the bottom of said sheet extends at least about 6 inches below the surface of still fresh water and top of said sheet extends at least about 4 inches above the surface of still fresh water;
(l) said buoyant sheet being from about ⅛ to about 1 inch thick;
(m) said buoyant sheet weighing from about 2 to about 10 pounds per cubic foot;
(n) the top edge of said sheet and the bottom edge of said sheet overlapping each other; and
(o) said second longitudinal pocket being longitudinally contiguous with said longitudinal pocket, whereby a figure-eight is formed.

15. The element for a boom recited in claim 14 further comprising a single longitudinal seam at said overlap forming said upper and lower longitudinal pockets.

* * * * *